F. O. LAKE.
VULCANIZING TONGS.
APPLICATION FILED JUNE 16, 1916.
1,219,414.
Patented Mar. 13, 1917.
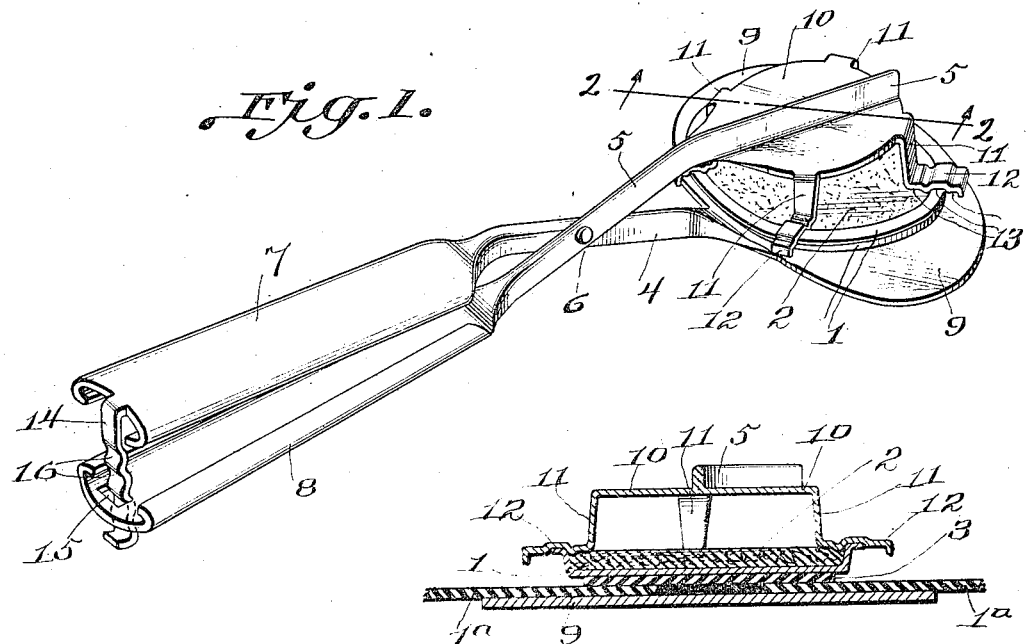
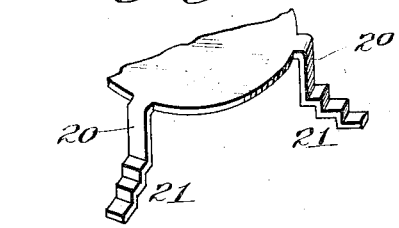
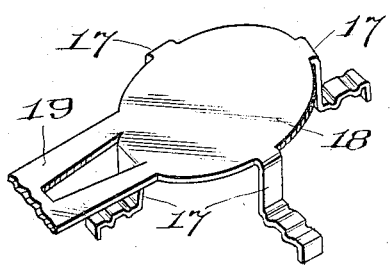
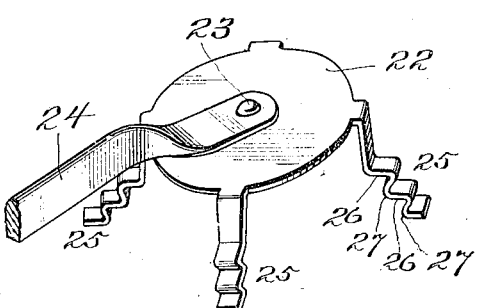
Inventor:
Fred O. Lake
by C. J. Bell
Atty.

UNITED STATES PATENT OFFICE.

FRED O. LAKE, OF WASHINGTON, DISTRICT OF COLUMBIA.

VULCANIZING-TONGS.

1,219,414.　　　　Specification of Letters Patent.　　Patented Mar. 13, 1917.

Application filed June 16, 1916. Serial No. 104,011.

*To all whom it may concern:*

Be it known that I, FRED O. LAKE, a citizen of the United States, residing at Washington, in the District of Columbia, have invented certain new and useful Improvements in Vulcanizing-Tongs, of which the following is a specification.

This invention relates to tools and implements for vulcanizing purposes, and pertains especially to an implement particularly adapted for patch-vulcanizing through the medium of an ordinary pan or tray having the patch attached thereto and containing an inflammable element.

The object of the invention is to provide a tong-like implement of novel and peculiar design specially constructed for applying rubber patches and for clamping the same in proper position during vulcanization.

A further object of the invention is to provide a hand implement in the shape of pliers or tongs which shall have such construction and combination of parts as to retain and to operate in connection with rubber patches and patch holders of various size and shape for vulcanizing the same.

A still further object of the invention is to provide a simple, inexpensive implement of such strength and durability as will afford means for expeditiously repairing and vulcanizing tire and other patches in a most convenient manner, and with such perfection as to be substantially permanent.

As far as known to applicant, such devices and apparatus usually comprise a special gas or oil burner member, an anvil member, and various mechanism for clamping the punctured or torn tire portion and the patch therebetween. In addition to the weight and cumbersome condition of such devices and apparatus, they comprise a multiplicity of parts requiring separate and repeated manipulation in their application and operation. It is the purpose of this invention to overcome the disadvantages and difficulties found in such device and apparatus and to avoid the usual imperfect and unsatisfactory results usually experienced in tire and other patching and to furnish an implement complete in itself and without contributory mechanism or devices for its operation in connection with a patch tray or pan containing inflammable material. To these ends, the invention consists in the novel and peculiar construction and arrangement of the parts comprising a tong-like clamp for holding, applying and vulcanizing patches upon rubber tires, and various other rubber articles capable of having the device applied thereto.

In the accompanying drawings forming part of this application:—

Figure 1 is a perspective view showing the parts in position as applied to a tire.

Fig. 2 is a sectional view showing the application of the device in a patching operation.

Fig. 3 is a detail perspective view of a modification.

Fig. 4 is a perspective view of a further modification.

Fig. 5 is a perspective view of a further modification.

The same reference characters denote the same parts throughout the several views of the drawings.

The tray or pan 1, is of common form, and the inflammable paper pad or sheet 2, contained in the tray, is of the usual character, and has a patch 3 attached to the bottom thereof as usual. The tong members 4 and 5 are each preferably composed of one piece of suitable metal, or the member heads and handle portions hereinafter referred to, may be made separately and attached in position by any suitable means. The said members are pivoted together at 6, and have handle portions 7 and 8 respectively. The tong-member 4 has a plate head or jaw 9 of such shape as to conform with the shape of the tray 1, and of such size as to accommodate trays of various size. The tong-member 5 has a head or jaw 10 provided with a plurality of depending legs 11 spaced apart and reaching approximately to the plate-head or jaw 9, in closed position, without the tray. The legs are preferably struck or formed out of or in the same piece with the head or jaw 10, and each of said legs is provided with a lateral projection constituting a clamping foot 12. Each foot has a plurality of shoulders or seats 13 corresponding with the various sizes of pans applicable thereto, so that the rim of the pans may fit one or another of the seats and thereby centralize the pan with respect to the heads or jaws 9 and 10, in a clamping or vulcanizing operation. Said seats also retain the trays with a patch in proper position as placed over a tire or other article as 1ᵃ to be patched and prevent the feet from slipping off the tray rim during a clamping and vulcanizing operation.

In order to secure the tong-members in clamped position, I provide a locking device which consists of a spring tongue 14 projecting at right angles from the handle portion 7, and insertible through a slot 15 in the end of the other handle portion 8. Said tongue having teeth or corrugations 16, for engaging an edge of the slot so as to hold the members in desired clamping position and to prevent the opening thereof without pressing the tongue inwardly.

Referring to Fig. 3, the legs 20 are straight, and have step-like feet 21 for clamping trays of various height and diameter.

Referring to Fig. 5 of the drawings, one of the arms 17 of the head 18 is struck out of the tong-member 19.

Referring to the modification shown in Fig. 4 of the drawings, the pronged head 22 is swiveled at 23, to the end of the tong-member 24, and the feet 25 have seats 26, and shoulders 27 which set in under the seats, for clamping trays of various shapes and sizes.

Obviously other variations in the pronged or legged head, and in the feet, may be made in the development of the device.

It will be understood that in a vulcanizing operation, a tire, or other article to be patched, is placed upon the plate-head, the tray containing the paper pad and the patch is placed upon the tire or article, the tong-members are locked in clamped position, and the pad ignited. These parts may be left in said position for complete vulcanization, without attention on the part of the operator, and then removed as desired.

Obviously the device is not limited in application to tire repairing, but may be expeditiously employed for vulcanizing various rubber articles, therefore I do not wish to be understood as limiting the invention in its application, nor do I desire to confine myself to any particular size or material, nor to any particular connection of the pronged head with its tong-member, nor to any particular number or shape of the clamping feet, but reserve to myself the right to make such changes and variations in the manufacture of the several parts of the device as may come within the scope of the appended claims.

Having thus described my invention what I claim as new and desire to secure by Letters Patent is:—

1. A vulcanizing implement comprising a pair of hand tongs having handle portions, a series of depending legs branched from the free end of one of the tong-members, a foot projecting outwardly from each leg and having a plurality of seats, and a clamping plate branched from the free end of the other tong-member, and extending beyond the foot ends for clamping vulcanizing elements of various size.

2. A vulcanizing implement comprising a pair of hand tongs having handle portions, a plate head extension of one of the tong-members, a series of depending legs branched from the head, a foot extension of each leg projecting outwardly, a plurality of seats in each foot, a clamping plate branched from the other tong-member and extending under the seats and beyond the foot ends, and a tongue and slot device formed in the handle portions for locking the members in clamped position.

In witness whereof. I hereunto set my hand in the presence of two witnesses.

FRED O. LAKE.

Witnesses:
C. T. BELT,
R. F. LANSDALE.